United States Patent
Little et al.

(10) Patent No.: US 7,757,079 B2
(45) Date of Patent: *Jul. 13, 2010

(54) SYSTEM AND METHOD FOR SUPPORTING MULTIPLE CERTIFICATE AUTHORITIES ON A MOBILE COMMUNICATION DEVICE

(75) Inventors: Herbert A. Little, Waterloo (CA); Michael S. Brown, Waterloo (CA)

(73) Assignee: Research In Motion Limited, Waterloo (CA)

( * ) Notice: Subject to any disclaimer, the term of this patent is extended or adjusted under 35 U.S.C. 154(b) by 510 days.

This patent is subject to a terminal disclaimer.

(21) Appl. No.: 11/690,977

(22) Filed: Mar. 26, 2007

(65) Prior Publication Data

US 2007/0168660 A1 Jul. 19, 2007

Related U.S. Application Data

(63) Continuation of application No. 11/398,428, filed on Apr. 5, 2006, now Pat. No. 7,197,296, and a continuation of application No. 10/484,278, filed as application No. PCT/CA02/01117 on Jul. 16, 2002, now Pat. No. 7,046,991.

(60) Provisional application No. 60/305,667, filed on Jul. 16, 2001.

(51) Int. Cl.
*H04M 1/66* (2006.01)

(52) U.S. Cl. .................. 713/158; 455/410; 455/411

(58) Field of Classification Search .................. None
See application file for complete search history.

(56) References Cited

U.S. PATENT DOCUMENTS

| 5,745,574 | A | 4/1998 | Muftic |
| 6,192,130 | B1 | 2/2001 | Otway |
| 6,247,127 | B1 * | 6/2001 | Vandergeest ............... 713/100 |
| 6,463,534 | B1 | 10/2002 | Geiger et al. |
| 6,711,263 | B1 | 3/2004 | Nordenstam et al. |
| 7,080,251 | B2 * | 7/2006 | Fujishiro et al. ........... 713/171 |
| 2003/0115456 | A1 | 6/2003 | Kapoor |
| 2004/0103283 | A1 | 5/2004 | Hornak |

OTHER PUBLICATIONS

Open Group: Technical Standard, Part 1: Common Data Security Architecture (CDSA), May 2000, pp. 1-46, 123-128, 305-311, 427-431, XP-002230006.

Feiertag, et al.: A Framework for Building Composable Replaceable Security Services, Jan. 2000, pp. 391-402, XP-010371140.

* cited by examiner

*Primary Examiner*—Erika A Gary
(74) *Attorney, Agent, or Firm*—Jones Day; Krishna K. Pathiyal; Robert C. Liang

(57) ABSTRACT

A system and method for supporting operations with multiple certification authorities (CAs) on a communication device. A common CA interface is provided between a plurality of secure communication applications and a plurality of CA-specific components, each of which interacts with a particular CA. A further common interface may also be provided for operatively coupling the secure communication applications to cryptographic components in the device.

20 Claims, 7 Drawing Sheets

SYSTEM AND METHOD FOR SUPPORTING MULTIPLE CERTIFICATE AUTHORITIES ON A MOBILE COMMUNICATION DEVICE

CROSS-REFERENCE RELATED APPLICATION

This application is a continuation of U.S. application Ser. No. 11/398,428 filed Apr. 5, 2006 (now U.S. Pat. No. 7,197, 296). U.S. Pat. No. 7,197,296 is a continuation of U.S. application Ser. No. 10/484,278 filed Jan. 15, 2004 (now U.S. Pat. No. 7,046,991), which is a 371 of PCT/CA02/01117 filed Jul. 16, 2002, which claims priority from U.S. provisional application Ser. No. 60/305,667 entitled "A System And Method For Supporting Multiple Certification Authorities On A Mobile Communication Device" filed Jul. 16, 2001. By this reference, the full disclosures, including the drawings, of each of these priority applications are incorporated herein.

BACKGROUND

1. Technical Field

This invention relates generally to the field of communications, and in particular to secure communications.

2. Description of the State of the Art

In many modern communication systems, security of information is a major concern. When a communication system or medium cannot be physically secured, such as in wireless communication networks or wide area networks like the Internet, a secure communication scheme may be critical. For example, in so-called electronic commerce (e-commerce) and mobile commerce (m-commerce) transactions, credit card, financial or other confidential or sensitive information must be transferred between parties. Such information is normally encrypted before being sent over a communication network and a receiver of the information then decrypts the encrypted information to recover the original information.

A typical problem in secure communication systems is managing the encryption and decryption of information. One known secure communication scheme is a so-called public key scheme, in which a public key is used to encrypt information and a corresponding private key is used for decryption. For example, if two parties, commonly referred to as "Alice" and "Bob" for illustrative purposes, wish to securely exchange information, then Alice must be able to decrypt any information encrypted for her by Bob and Bob must be able to decrypt any information encrypted for him by Alice. In a public key system, Alice and Bob would each use a respective secret or private key a, b to decrypt information which was encrypted using a corresponding public key A, B. Therefore, Alice and Bob are able to decrypt information which was encrypted using their respective public keys A, B. Similarly, in a public key system, any sender must use the public key for an intended receiver of the information. Even though others may know the values of the public keys, the corresponding private keys are required for decryption and are kept secret. The public and private keys are normally designed such that it is not computationally feasible to decrypt encrypted information or derive the private key using the public key.

Thus, in order for a sender to securely send information to a receiver, the sender must somehow obtain the receiver's public key; otherwise, the receiver will be unable to decrypt the received information. This key distribution function is normally performed by a certificate authority (CA), which maintains a record of public keys for a plurality of users in the system. A sender can then obtain the receivers public key from the CA and use the public key to encrypt information to be sent to the receiver. In the above example of Alice and Bob, Alice may contact a CA to obtain Bob's public key B and then use the public key to encrypt transmissions to Bob. Using the private key b, Bob is able to decrypt any encrypted information received from Alice.

In known systems, a CA normally returns a digital certificate in response to a request for a public key. A digital certificate is generated by the CA and typically contains such certificate information as a name of the entity to which the public key corresponds (commonly known as the subject name), a date the certificate was issued, the public key, and possibly other information. The CA generates a digital signature, which binds the entity or subject name to the public key, for example by performing one or more preferably non-invertible mathematical operations such as a hash on the certificate and applying a private key of the CA to the result. The certificate can then be validated by verifying this digital signature using the public key of the CA.

Some known systems similarly provide for verification of communications through private key-generated signatures. For example, when Alice wishes to communicate with Bob, Alice may generate a digital signature using her private key a and append the digital signature to the information to be transmitted. Bob can then use Alice's public key A to verify the digital signature and thereby confirm that the information was actually sent by Alice.

However, not every entity that may be involved in secure communications is registered with a single global CA. Many different CAs currently exist, any of which may be chosen by an entity to manage its public key. Since each CA may use different information transfer protocols, an information sender may need to support the transfer protocols of multiple CAs, for example where the particular operations or applications resident on a system require access to different CAs. In communication devices such as mobile communication devices, which tend to have limited memory and processing resources, multiple CA support becomes particularly challenging.

SUMMARY

In accordance with the teachings disclosed herein, a system and method are provided for supporting operations with multiple CAs on a communication device. A common CA interface is provided between a plurality of secure communication applications and a plurality of CA-specific components, each of which interacts with a particular CA. A further common interface may also be provided for operatively coupling the secure communication applications to cryptographic components in the device. Further features of the system and method will be described or will become apparent in the course of the following detailed description.

BRIEF DESCRIPTION OF THE DRAWINGS

In order that the invention may be more clearly understood, preferred embodiments thereof will now be described in detail by way of example, with reference to the accompanying drawings, in which.

DETAILED DESCRIPTION

Figure 1:
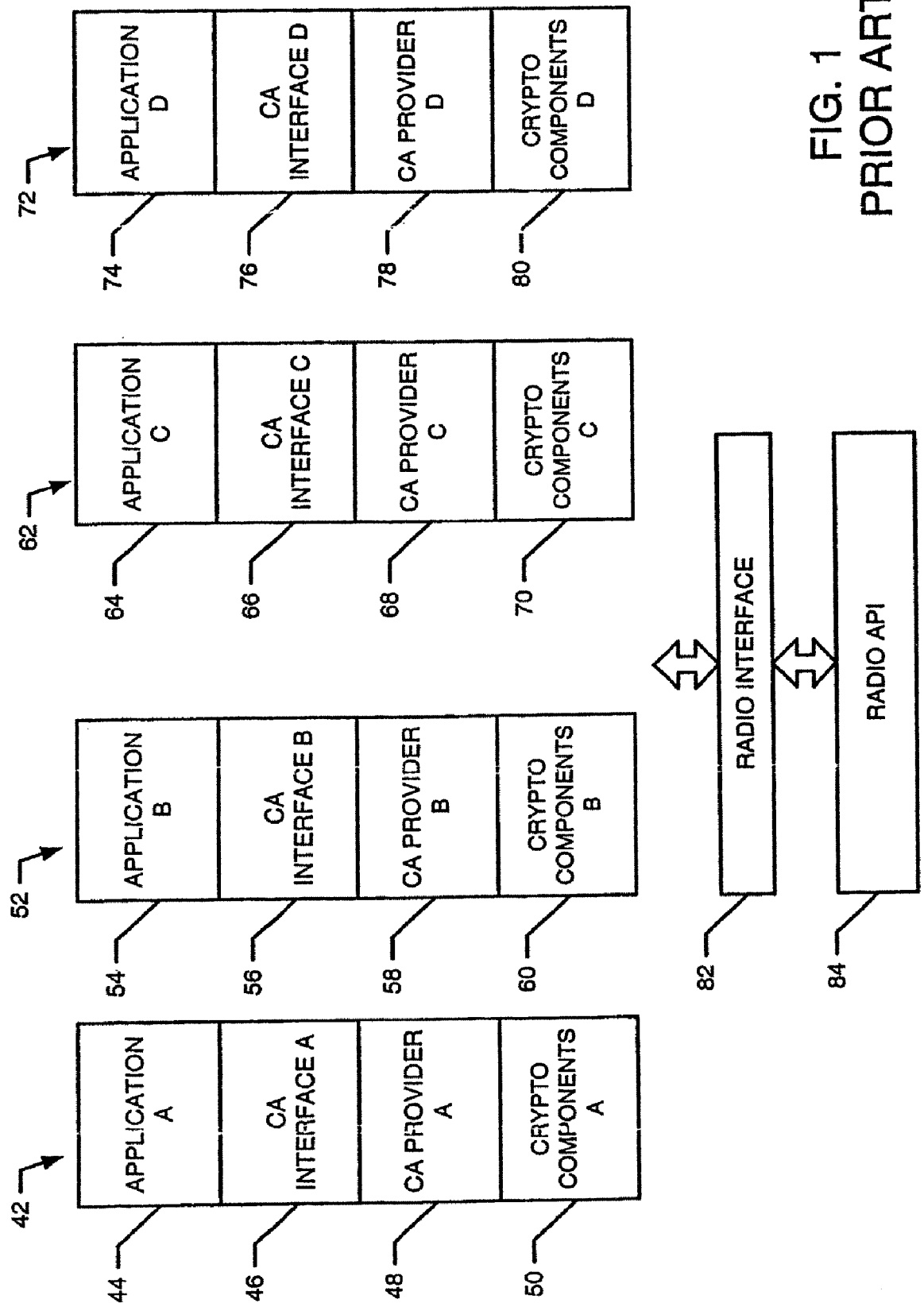
FIG. 1 is a software block diagram of a known system for supporting multiple CAs.

FIG. 1 is a software block diagram of a known system for supporting multiple CAs, which shows several software applications 42, 52, 62, 72, which may be resident on a wireless mobile communication device ("mobile device"). Each software application 42, 52, 62, 72 includes an application component 44, 54, 64, 74, a CA interface 46, 56, 66, 76 to a respective CA provider component 48, 58, 68, 78, and cryptographic (crypto) components 50, 60, 70, 80. Since communication with another system such as a CA may require interaction with a communication subsystem of the mobile device, a radio interface 82 and radio application programming interface (API) 84 are also shown in FIG. 1.

A mobile device on which multiple CAs may be supported in accordance with the teachings herein may, for example, be a data communication device, a voice communication device, a dual-mode communication device, such as a mobile telephone having data communications capabilities, enabled for both voice and data communications, a two-way pager, a personal digital assistant (PDA) enabled for communications, or a desktop, palmtop or laptop computer having a wireless modem. Other types of mobile devices on which support for multiple CAs may also be desirable or required will be apparent to those skilled in the art.

The CA interfaces 46, 56, 66, 76 provide an interface between a corresponding application component 44, 54, 64, 74 and a CA provider component 48, 58, 68, 78. The provider components enable communications between a CA and the mobile device application components. Crypto components 50, 60, 70 and 80 are effectively encryption/decryption modules and perform such cryptographic functions as encryption, digital signature generation, decryption and digital signature verification.

The radio interface 82 and radio API 84 provide the applications 42, 52, 62, 72 with access to the communication functions and capabilities of the communication device. Through the interface 82 and radio API 84, an application may perform any required communication functions by using, for example, function calls or other such software code or modules compatible with the radio API 84.

With reference to one of the applications in particular, application 42, overall operation of the system in FIG. 1 will be described. During the execution of application A 44, suppose that a certain operation requires that information be securely exchanged with a particular party. Through the corresponding CA interface A 46, the application 44 may invoke processing in the CA provider component A 48 to request a public key for the other party from the particular CA. As described above, the request may be signed with a digital signature generated by the crypto components A 50, and the request itself may also be encrypted by the crypto components A 50. The provider component A 48 then sends the request through the radio interface 82 and radio API 84 to the appropriate CA system (not shown), which may, for example, be configured for operation on the Internet or other network accessible to the mobile device.

When a certificate is received from the CA, the provider component A 48 parses the certificate and passes the certificate and digital signature, if present, to the crypto components A 50 for decryption if necessary and digital signature verification. After the certificate has been verified, the public key therein, in conjunction with a cipher algorithm which the crypto components A 50 are configured to apply, can be used by the crypto components to encrypt any information from the application A 44 to be sent to the other party. The crypto components A 50 similarly operate to decrypt any received encrypted information for application A 44 using the private key associated with the mobile device or a user of the mobile device and a cipher algorithm. Received digital signatures may be verified using a public key of a sender, which may be stored on the mobile device or requested from a CA as described above.

A further function of the CA interface A 46, CA provider component A 48 and crypto components A 50 for application A 44 is to provide the public key associated with the mobile device or user to the corresponding CA when required. For example, if the device generates, selects or is otherwise provided with a new key pair including a new private key and a new public key, then the CA for application 42 should be updated to reflect the new public key. Otherwise, secure communication operations between the mobile device application 42 and another party registered with the CA for application A 44 may fail. If the CA is not updated when a device key pair changes, the other party may retrieve an old copy of the public key of the mobile device or user from the CA and may then be unable to encrypt information in a format that can be decrypted at the mobile device and may not be able to verify any digital signatures appended to communications from the mobile device, since the mobile device and the other party are using keys from different key pairs. The old private key may be used by the crypto components A 50 to generate a digital signature, and at least an identity associated with the mobile device or user, the new public key and the digital signature are then sent to the CA through the provider component A 48. The new public key will normally be registered with the CA upon verification of the digital signature by the CA using the old public key.

As is apparent from FIG. 1, each application includes, in addition to an application component, custom CA-related and crypto components that are specific to a particular CA or CA provider. In FIG. 1, applications 42, 52, 62 and 72 use different CA providers A, B and C. Although more than one of the applications might be configured for the same CA provider, separate interface, provider and crypto components are included in each application in known systems. Therefore, each application is specific to a particular CA provider.

For example, application 42 may be a banking application, such that the corresponding CA provider is chosen and trusted by the particular bank with which application A is designed to operate. Similarly, the operators of a confidential database may choose a different CA provider for a remote database query application, application 72 for example, which would then be developed specifically for the particular CA provider. Even if the same CA provider is selected for both the banking application 42 and the remote query application 72, known systems do not provide mechanisms whereby a CA interface, a CA provider component and crypto components can be shared between applications. This may lead to relatively large application file size, which can quickly exhaust available memory and processing resources, particularly in such communication devices as mobile devices with typically limited memory space and processing capabilities.

Figure 2:
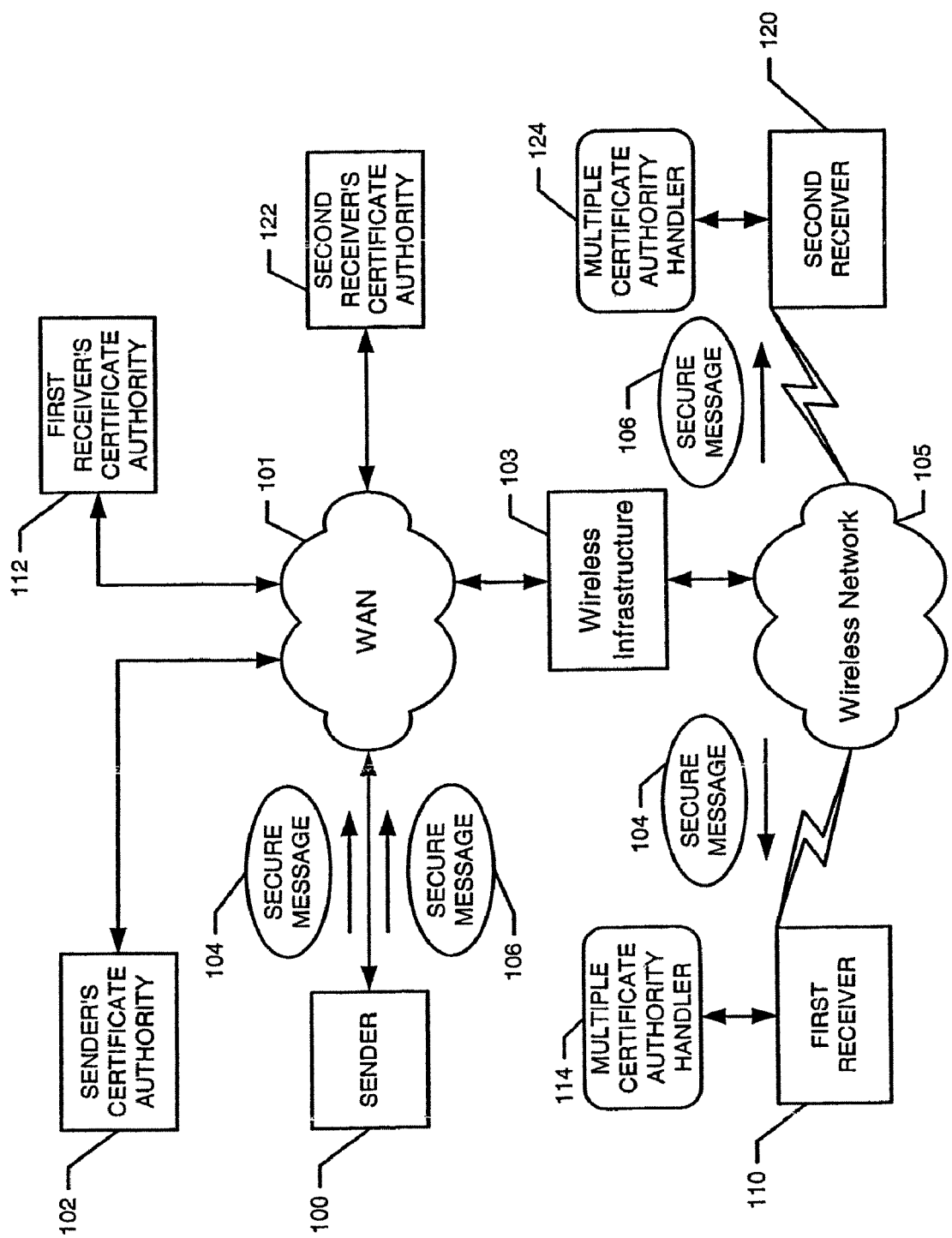
FIG. 2 is a system block diagram illustrating a communication system with multiple CAs.

A multiple CA handler may be used to more efficiently process secure messages involving one or more CAs. There are many configurations possible for the CA handler software. For example, FIG. 2 is a system block diagram illustrating a communication system with multiple CAs. FIG. 2 depicts use of multiple CA handlers 114, 124 on receiver mobile devices 110, 120 for processing secure messages 104, 106 from a sender 100.

The communication system shown in FIG. 2 includes a sender system 100, a Wide Area Network (WAN) 101, three CAs 102, 112, 124, wireless infrastructure 103, a wireless communication network 105, and first and second receiver mobile devices 110, 120. Those skilled in the art will appreciate that communication systems may have many different topologies, and that the system shown in FIG. 2 is intended for illustrative purposes only. For example, although only one sender 100 and two mobile devices 110, 120 are shown in FIG. 2, a typical communication system may include thousands, or more, computers systems and mobile devices. Senders and receivers may also communicate through multiple WANs and wireless networks.

The sender system 100 may, for example, be a personal computer, laptop computer, or palmtop computer, which is associated with a software application operating on the receiver mobile devices 110 and 120. For example, the sender system 100 may be a host system by which messages addressed to the sender system 100 are sent to a corresponding mobile device 110 or 120. The sender system 100 could also be an electronic messaging client configured to send and possibly receive secure email messages. For an electronic banking application on a mobile device, the sender 100 may be a networked computer in a Local Area Network (LAN) installed at a bank. Other types of sender systems are also contemplated.

The WAN 101 will typically be the Internet. The sender 100, CAs 102, 112, 122, and wireless infrastructure 103 may be connected to the WAN 101 directly, as shown, or through an Internet Service Provider (ISP), Application Service Provider (ASP) or other intermediate system.

The three CAs 102, 112, 122 are associated with, and store the public keys of, the sender 100, the first receiver 110 and the second receiver 120, respectively. Even though the CAs 102, 112, 122 are associated with different entities, i.e., the sender system 100 and receiver mobile devices 110, 120, any of the entities can access any of the CAs through the WAN 101, such that any of the entities may exchange secure communications with any of the other entities using public key crypto techniques.

Wireless infrastructure component 103 may be a gateway system which bridges the WAN 101 and the wireless network 105, providing such functionality as protocol translation, mobile device address translation, and any other operations required in order to deliver communications from the WAN 101 to the mobile devices 110, 120. Although shown in FIG. 2 as a separate component, wireless infrastructure 103 may form part of the WAN 101 or wireless network 105, or both networks may incorporate some of the functionality of the wireless infrastructure 103.

The mobile devices 110, 120 are configured for operation within the wireless network 105, which may be any of a plurality of different wireless communication networks. An example mobile device is described in further detail below in conjunction with FIG. 7.

In a secure messaging system, the sender 100 may use its own private key to generate digital signatures for secure messages 104, 106 that are to be sent. The sender 100 may also communicate with the receivers' respective CAs 112, 122 to obtain each receiver's public key to encrypt the messages 104, 106. The sender 100 may communicate with each CA through a custom CA interface as shown in FIG. 1 and described above, or may also include a multiple CA handler (not shown). Communications with any of the CAs shown in FIG. 2 may be established through the WAN 101. In some systems, CAs may instead be connected in a LAN for access by any computer systems, and possibly mobile devices, configured for access to the LAN.

The secure messages 104, 106 from the sender 100 ultimately are transmitted to the receiver mobile devices 110, 120. The mobile devices 110, 120 include multiple CA handlers 114, 124, which may be implemented as software modules, for example, to more efficiently process the secure messages 104, 106 with respect to the CAs 102, 114, 124 involved. Processing may include decryption, as well as other security processing, such as digital signature verification. Normally, when a public key and/or certificate information is required by a mobile device 110, 120, a request is submitted to the appropriate CA, which returns a digital certificate and possibly other certificate information to the mobile device 110, 120.

The nature and content of the secure messages 104, 106 may be different for different types of operations or software applications. For example, in the context of a banking software application operating on the mobile devices 110, 120, the secure messages 104, 106 may include transaction or financial information, and a multiple CA handler on the receiver mobile devices 110, 120 may retrieve public key(s) required for digital signature verification and/or decryption from one or more CAs.

It should be noted that, as shown in FIG. 2, not all parties to a communication exchange must necessarily implement a multiple CA handler. A multiple CA handler simplifies interactions between a mobile device and a CA, but is an optional component that preferably does not affect actual communications between mobile devices and other recipients. Multiple CA handlers provide a mechanism for obtaining digital certificates and possibly further certificate information from one or more CAs, but may be implemented so as not to change the way in which communication signals generated using such information are transmitted or received.

Figure 3:
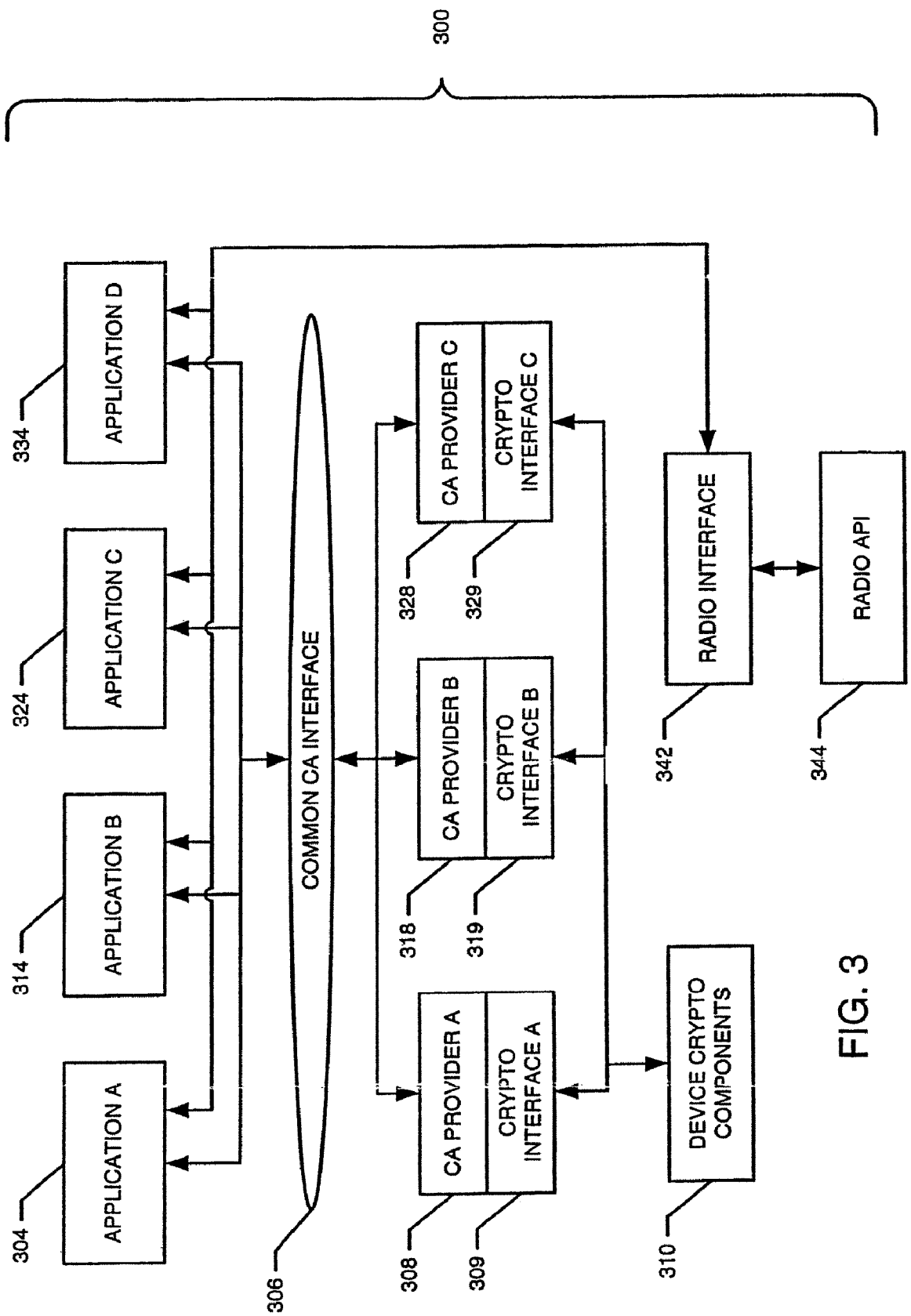
FIG. 3 is a software block diagram illustrating an example of a mobile device that supports multiple CAs.

FIG. 3 is a software block diagram illustrating an example of a mobile device that supports multiple CAs. The mobile device 300 includes a common CA interface 306 instead of multiple custom interfaces. The mobile device 300 uses crypto interfaces 309, 319 and 329, and may include a single set of crypto components 310 to replace the custom crypto components of FIG. 1, or may instead use the custom crypto components.

In the mobile device 300, software applications 304, 314, 324, 334 are configured to operate with the common CA interface 306 instead of a particular CA or CA provider. An application communication link is provided between the common CA interface 306 and each application 304, 314, 324, 334, through which data, such as a security-related request for information for a CA from an application and information returned by a CA in response to such a request, may be exchanged with the applications. It should be understood that a mobile device 300 may support an application using the common CA interface 306 to obtain information from a CA, as well as other applications using custom components particular to a CA. A mobile device in which a multiple CA handler has been implemented may thereby be backwards compatible with older software applications using custom components to communicate with a CA.

When information is exchanged with a CA (such as to register or request a public key for example), an application invokes any required processing at the appropriate CA provider component 308, 318, 328. If necessary, to encrypt information to be sent to the CA or to generate a digital signature for example, the provider component then sends crypto-related requests and information to the device crypto components 310 for processing via its respective crypto interface 309, 319, 329. Encrypted information and/or digital signatures are similarly received by a provider component (e.g., 308, 318, 328) from the crypto components 310 through its interface 309, 319, 329. In FIG. 3, encryption, decryption, and digital signature generation or verification operations are performed in the single set of device crypto components 310.

Information is preferably sent from and received by the applications 304, 314, 324, 334 through the radio interface 342 and the radio API 344. Each application 304, 314, 324, 334 may incorporate a software module or set of function calls associated with the radio interface 342 and/or the radio API 344. It is also possible that one or more of the provider components 308, 318, 328 may include such modules or function calls associated with the radio interface 342 and/or API 344 in order to exchange information with a CA directly, although the arrangement shown in FIG. 3 may provide for a more compact software system, since only the software applications, not both the software applications and provider components, incorporate radio software modules.

The applications 304, 314, 324, 334 are shown as applications involving secure communications. These applications may be shopping or other e-commerce applications, electronic messaging applications, banking applications, query or search applications for confidential remote databases, for example, but may be any applications for which secure information transfer may be desired or required. However, it should be understood that a mobile device may also include further applications (not shown), including applications providing communication functions, that do not require secure communications. More or fewer than the example four secure communication applications shown in FIG. 3 may also be resident on a device. The multiple-CA support arrangements described herein are in no way limited to a particular number or type of application.

For an application developer, the common CA interface 306 provides a single interface for communicating with a CA. Applications need not be CA-specific and may be written for operation with the common interface 306. Application developers therefore may elect to design a single standardized application interface.

In addition, the application development process is not dependent upon the particular CA or CA provider that will eventually be used for secure communications associated with the application. An application is developed on the basis of the common interface 306, the information that may be provided to or required from the application by the common CA interface 306, and the format of such information. A particular CA or provider can then be chosen after the application has been substantially completed, or even after the application has been installed on a mobile device. For example, a particular CA may be chosen from those for which the associated provider component 308, 318, 328 is resident on a mobile device. The common CA interface 306 may then act as a router of a security-related request to such a chosen provider component and handle the details needed for the request to be understood by the chosen provider component. The common interface 306 may also provide for changing the selected CA for an application, or possibly interaction of a single application with more than one CA.

Provider software code, including a provider component (e.g., 308, 318, 328) and a crypto interface 309, 319, 329, is accessible to and usable by more than one application. Applications which use the same CA or provider, such as applications A and D 304, 334 for example, can thereby share a single copy of the provider A software code 308. The total memory space occupied by secure communications applications and associated provider code can thereby be reduced, relative to memory requirements for known systems such as shown in FIG. 1.

A CA provider component 308, 318, 328 may similarly be developed for operation with the common interface 306. CA-specific protocols and information formats are thereby effectively "hidden" from the mobile device applications. By adapting its respective provider component for operation with the common interface 306, a CA or provider may make its services available to any application on a mobile device instead of only to custom or specially developed applications.

Crypto interfaces 309, 319, 329 may perform such functions as certificate parsing, in order to provide certificate and key information to the device crypto components 310 that are shared between all secure communication applications on a mobile device. For example, crypto interface A 309 may be an X.509 certificate parser, crypto interface B 319 may be an X9.68 certificate parser, whereas crypto interface C 329 may parse some other type of certificate. The device crypto components 310 may then be configured to process information from any of these parsers. Thus, a single set of device crypto components 310 provides cryptographic functions for all device secure communication applications.

A common CA interface 306 may provide for memory space savings in that each application need not include CA-specific components, and applications using the same CA or provider may share a provider component and crypto interface.

Figure 4:
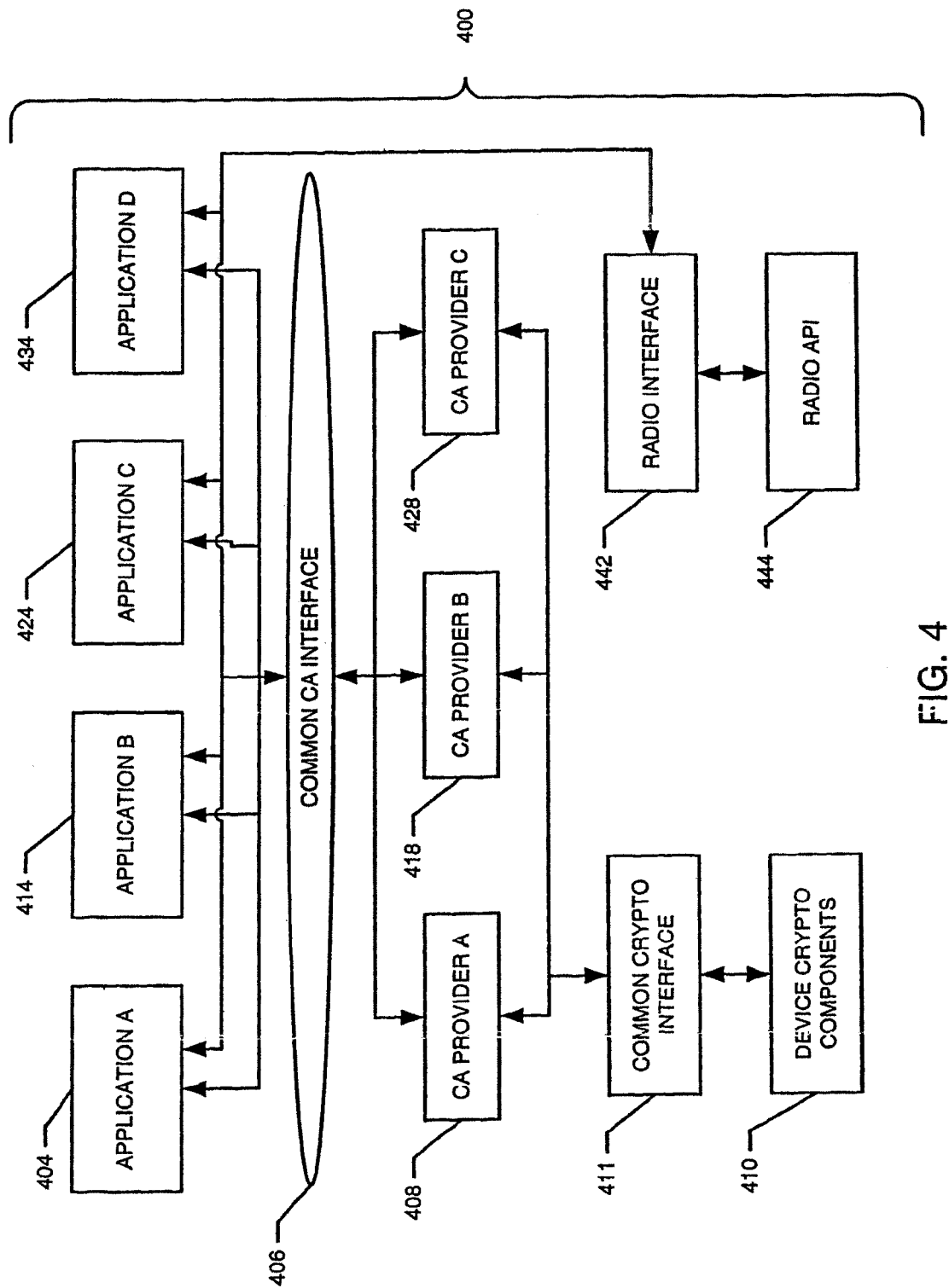
FIG. 4 is a software block diagram illustrating an alternative example mobile device that supports multiple CAs.

Further memory space savings may be realized by adapting provider components to operate with a single set of device crypto components. FIG. 4 is a software block diagram illustrating an alternative example mobile device that supports multiple CAs. In FIG. 4, the mobile device 400 includes a common crypto interface 411 between the CA provider components 408, 418, 428 and the crypto components 410. CA provider components 408, 418, 428 are adapted to operate with the common crypto interface 411. The common crypto interface 411 provides access to the device crypto components 410 for the secure communication applications and provider components on the mobile device 400, by providing crypto-related requests for crypto functions to the device crypto components, for example.

The supported CA providers may use the same type of certificates, such that certificate parsing for all providers may be performed at the common crypto interface 411 instead of by each provider component 408, 418, 428. The provider components 408, 418, 428 then pass received certificates to the interface 411. This arrangement allows a single parser to be used on the mobile device, instead of a parser for each provider component, such as described above in reference to the crypto interfaces 309, 319, 329 in FIG. 3. A CA provider which uses a different type of certificate may adapt its respective provider component 408, 418, 428 to incorporate a certificate translation function to thereby allow operation of its CA system with the device applications and crypto component 410. It should also be understood that one or more applications may use the common crypto interface 411 while another application uses its own crypto components, or includes a custom interface to the crypto components 410.

Figure 5:
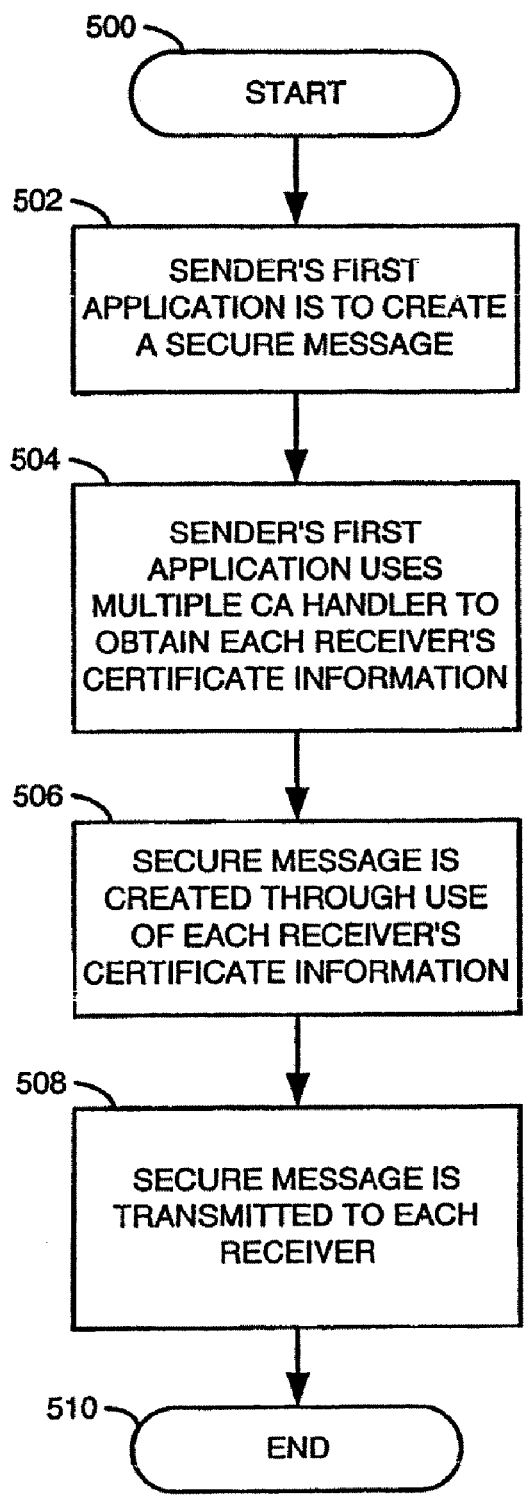
FIG. 5 is a flowchart illustrating an operational scenario on a sender mobile device using a multiple CA handler.

FIG. 5 is a flowchart illustrating an operational scenario on a sender mobile device using a multiple CA handler. As described above, a multiple CA handler may, for example, be implemented as a software module. With reference to FIG. 5, start block 500 indicates that at process step 502 a first application wishes to create and send a secure message from the mobile device. The first application uses the multiple CA handler to obtain certificate information from each of the receivers' CAs at step 504, so as to encrypt the message, for example. Certificate information will normally be provided in the form of a digital certificate, which typically includes at least a public key, and a subject name or other identification information bound to the public key by a digital signature. Digital certificates also often include expiry and validity information for the certificate. However, the type of certificate information provided by a CA may be different for different CAs, and need not necessarily be provided in the form of a digital certificate. In this description and the appended claims, certificate information includes any information, in a digital certificate or other formats, provided by a CA.

At step 506, the secure message is created through use of the obtained certificate information, and the secure message is transmitted to one or more receivers at step 508. When the secure message has been sent, the process ends at step 510.

The method shown in FIG. 5 may be repeated each time a software application is to create a secure message. A security-related request from the software application may be sent to an appropriate CA provider component through a common CA interface in order to obtain certificate information to be used in preparing the secure message from a respective CA.

Figure 6:
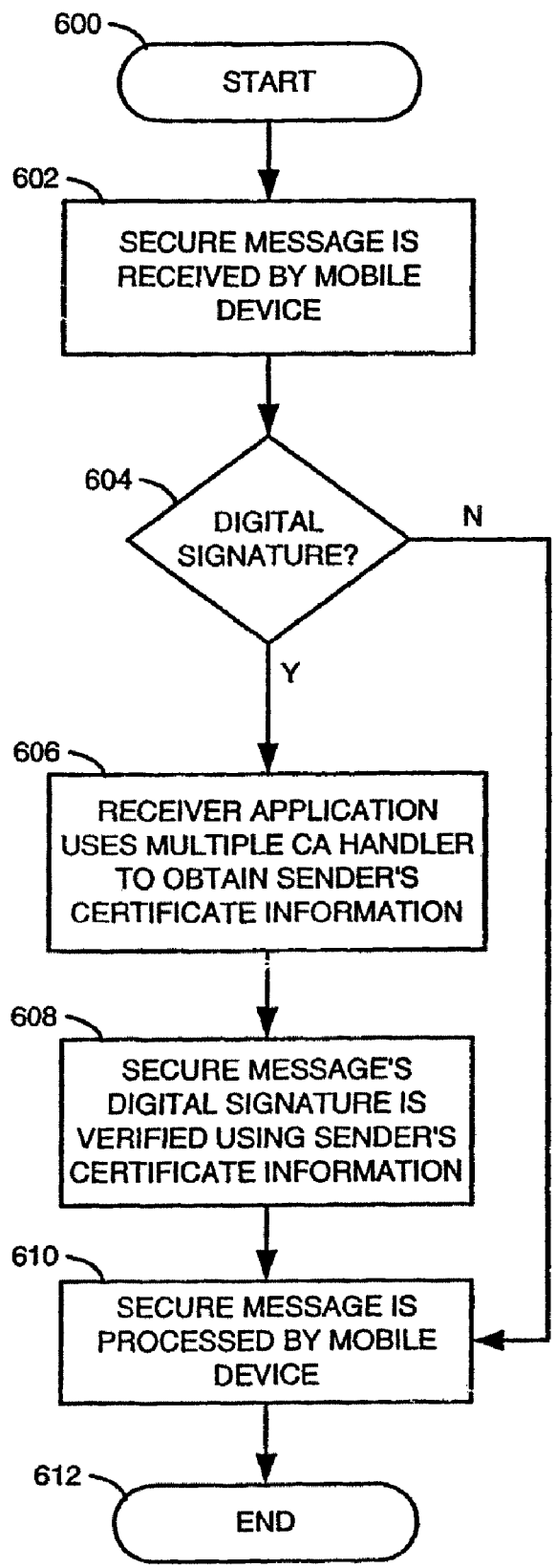
FIG. 6 is a flowchart illustrating an operational scenario using multiple CA handler by a receiver mobile device.

FIG. 6 is a flowchart illustrating an operational scenario using a multiple CA handler by a receiver mobile device. With reference to FIG. 6, start block 600 indicates that a secure message is received by a mobile device at step 602. At step 604, a determination is made as to whether a digital signature needs to be processed. The message is further processed and used by the mobile device at process block 610 where such processing need not be performed.

If a digital signature is involved as determined at step 604, then a software application on the receiver mobile device uses the multiple CA handler to obtain the senders certificate information at step 606. At process block 608, the digital signature is verified using the obtained certificate information. The message is further processed and used by the mobile device at process block 610. Processing for this example terminates at end block 612.

It will be appreciated that the above description relates to preferred embodiments by way of example only. Many variations on the invention will be obvious to those knowledgeable in the field, and such obvious variations are within the scope of the invention, whether or not expressly described. For example, although described primarily in the context of a mobile communication device, the systems and methods described herein are in no way limited thereto. These systems and methods are also applicable to other types of communication devices, including non-mobile devices. Mobile devices such as mobile data communication devices, mobile email devices, cellular telephones, two-way pagers and PDAs enabled for communications tend to have more limited memory and processing resources than other devices, including for example wired or wireless modems connected to computer systems, and may therefore derive greater benefit from the memory savings associated with the above systems and methods. However, these systems and methods, in addition to conserving memory space, provide flexibility in CA-related operations and thus provide further benefits for application developers and CA providers regardless of the type of communication device.

Figure 7:
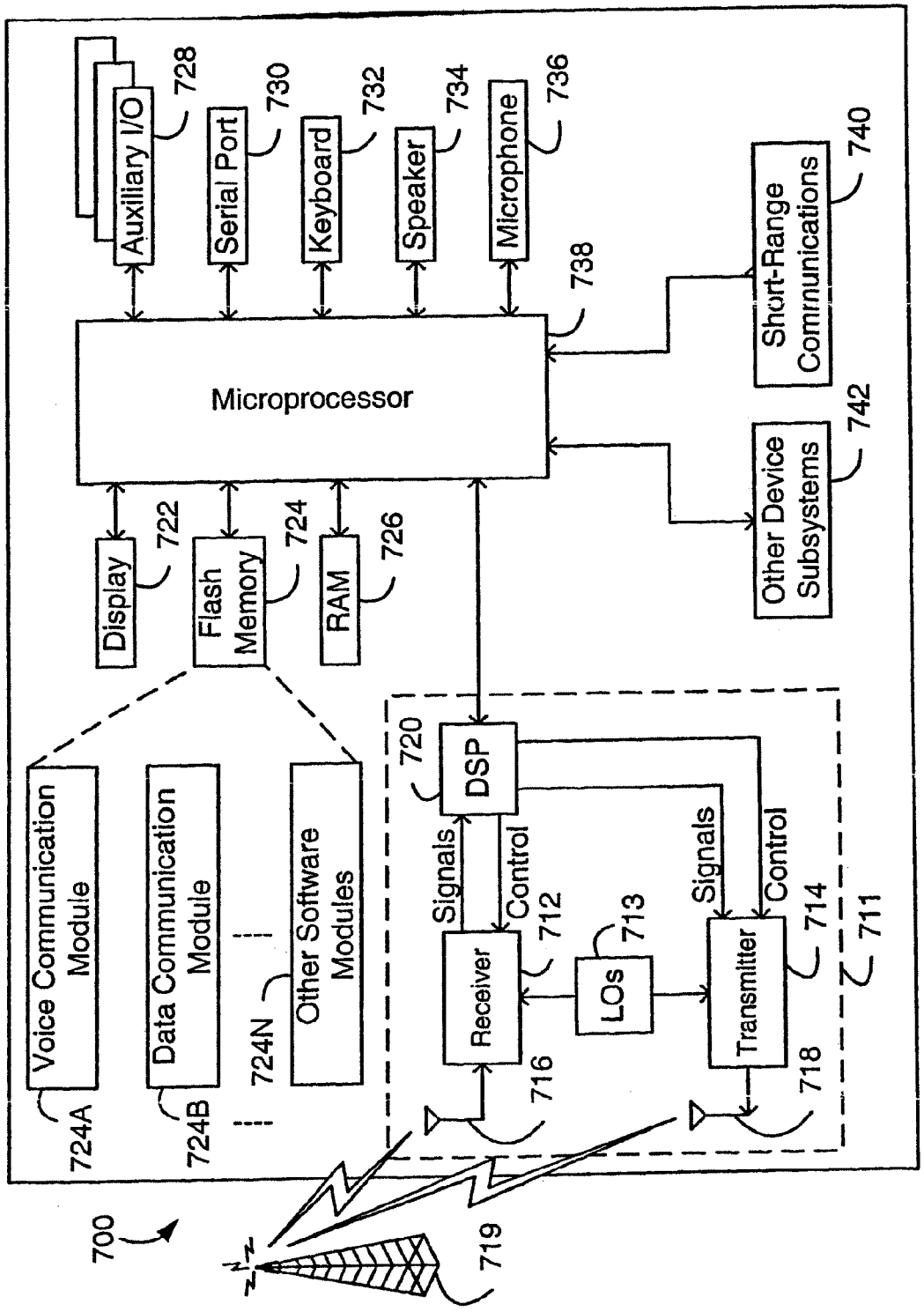
FIG. 7 is a block diagram of an example wireless mobile communication device.

The system and method described above may be implemented in conjunction with many different types of mobile device. FIG. 7 is a block diagram of one such example wireless mobile communication device. The mobile device 700 is a dual-mode mobile device and includes a transceiver 711, a microprocessor 738, a display 722, Flash memory 724, random access memory (RAM) 726, one or more auxiliary input/output (I/O) devices 728, a serial port 730, a keyboard 732, a speaker 734, a microphone 736, a short-range wireless communications sub-system 740, and may also include other device sub-systems 742.

The transceiver 711 includes a receiver 712, a transmitter 714, antennas 716 and 718, one or more local oscillators 713, and a digital signal processor (DSP) 720. The antennas 716 and 718 may be antenna elements of a multiple-element antenna, and are preferably embedded antennas. However, the systems and methods described herein are in no way restricted to a particular type of antenna.

Within the Flash memory 724, the device 700 preferably includes a plurality of software modules 724A-1124N that can be executed by the microprocessor 738 (and/or the DSP 720), including a voice communication module 724A, a data communication module 724B, and a plurality of other operational modules 724N for carrying out a plurality of other functions.

The mobile device 700 is preferably a two-way communication device having voice and data communication capabilities. Thus, for example, the mobile device 700 may communicate over a voice network, such as any of the analog or digital cellular networks, and may also communicate over a data network. The voice and data networks are depicted in FIG. 7 by the communication tower 719. These voice and data networks may be separate communication networks using separate infrastructure, such as base stations, network controllers, etc., or they may be integrated into a single wireless network.

The transceiver 711 is used to communicate with the network or networks 719, and includes the receiver 712, the transmitter 714, the one or more local oscillators 713 and may also include the DSP 720. The DSP 720 is used to send and receive signals to and from the transceivers 716 and 718, and may also provide control information to the receiver 712 and the transmitter 714. If the voice and data communications occur at a single frequency, or closely-spaced sets of frequencies, then a single local oscillator 713 may be used in conjunction with the receiver 712 and the transmitter 714. Alternatively, if different frequencies are utilized for voice communications versus data communications for example, then a plurality of local oscillators 713 can be used to generate a plurality of frequencies corresponding to the voice and data networks 719. Information, which includes both voice and data information, is communicated to and from the transceiver 711 via a link between the DSP 720 and the microprocessor 738.

The detailed design of the transceiver 711, such as frequency band, component selection, power level, etc., will be dependent upon the communication network 719 in which the mobile device 700 is intended to operate. For example, a mobile device 700 intended to operate in a North American market may include a transceiver 711 designed to operate with any of a variety of voice communication networks, such as the Mobitex™ or DataTAC™ mobile data communication networks, AMPS, TDMA, CDMA, PCS, etc., whereas a mobile device 700 intended for use in Europe may be configured to operate with the General Packet Radio Service (GPRS) data communication network and the Global System for Mobile Communications (GSM) voice communication network. Other types of data and voice networks, both separate and integrated, may also be utilized with a mobile device 700.

Depending upon the type of network or networks 719, the access requirements for the mobile device 700 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module (SIM), which is required in order to operate a mobile device on a GPRS network. Local or non-network communication functions (if any) may be operable, without the SIM device, but a mobile device will be unable to carry out any functions involving communications over the data network 719, other than any legally required operations, such as '911' emergency calling.

After any required network registration or activation procedures have been completed, the mobile device 700 may the send and receive communication signals, including both voice and data signals, over the networks 719. Signals received by the antenna 716 from the communication network 719 are routed to the receiver 712, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 720. In a similar manner, signals to be transmitted to the network 719 are processed, including modulation and encoding, for example, by the DSP 720 and are then provided to the transmitter 714 for digital to analog conversion, frequency up conversion, filtering, amplification and transmission to the communication network 719 via the antenna 718.

In addition to processing the communication signals, the DSP 720 also provides for transceiver control. For example, the gain levels applied to communication signals in the receiver 712 and the transmitter 714 may be adaptively controlled through automatic gain control algorithms implemented in the DSP 720. Other transceiver control algorithms could also be implemented in the DSP 720 in order to provide more sophisticated control of the transceiver 711.

The microprocessor 738 preferably manages and controls the overall operation of the mobile device 700. Many types of microprocessors or microcontrollers could be used here, or, alternatively, a single DSP 720 could be used to carry out the functions of the microprocessor 738. Low-level communication functions, including at least data and voice communications, are performed through the DSP 720 in the transceiver 711. Other, high-level communication applications, such as a voice communication application 724A, and a data communication application 724B may be stored in the Flash memory 724 for execution by the microprocessor 738. For example, the voice communication module 724A may provide a high-level user interface operable to transmit and receive voice calls between the mobile device 700 and a plurality of other voice or dual-mode devices via the network 719. Similarly, the data communication module 724B may provide a high-level user interface operable for sending and receiving data, such as e-mail messages, files, organizer information, short text messages, etc., between the mobile device 700 and a plurality of other data devices via the networks 719. The microprocessor 738 also interacts with other device subsystems, such as the display 722, Flash memory 724, RAM 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722 may be used for both communication-related functions, such as entering a text message for transmission over a data communication network, and device-resident functions such as a calculator or task list or other PDA type functions.

Operating system software used by the microprocessor 738 is preferably stored in a persistent store such as Flash memory 724. In addition to the operating system, which controls low-level functions of the mobile device 710, the Flash memory 724 may include a plurality of high-level software application programs, or modules, such as a voice communication module 724A, a data communication module 724B, an organizer module (not shown), or any other type of software module 724N. These modules are executed by the microprocessor 738 and provide a high-level interface between a user and the mobile device 700. This interface typically includes a graphical component provided through the display 722, and an input/output component provided through the auxiliary I/O 728, keyboard 732, speaker 734, and microphone 736. The operating system, specific device applications or modules, or parts thereof, may be temporarily loaded into a volatile store, such as RAM 726 for faster operation. Moreover, received communication signals may also be temporarily stored to RAM 726, before permanently writing them to a file system located in a persistent store such as the Flash memory 724.

An exemplary application module 724N that may be loaded onto the mobile device 700 is a personal information manager (PIM) application providing PDA functionality, such as calendar events, appointments, and task items. This module 724N may also interact with the voice communication module 724A for managing phone calls, voice mails, etc., and may also interact with the data communication module for managing e-mail communications and other data transmissions. Alternatively, all of the functionality of the voice communication module 724A and the data communication module 724B may be integrated into the PIM module.

The Flash memory 724 preferably also provides a file system to facilitate storage of PIM data items on the device. The PIM application preferably includes the ability to send and receive data items, either by itself, or in conjunction with the voice and data communication modules 724A, 724B, via the wireless networks 719. The PIM data items are preferably seamlessly integrated, synchronized and updated, via the wireless networks 719, with a corresponding set of data items stored or associated with a host computer system, thereby creating a mirrored system for data items associated with a particular user.

Other types of software applications that may be installed on the mobile device 700 include secure communications applications enabling secure messaging, as well as banking and other e-commerce and m-commerce applications, for example. The common CA interface 306, 406 and/or common crypto interface 411 may be implemented as further software modules in the Flash memory 724, RAM 726, or another memory (not shown) in the mobile device 700. Any applications enabling or requiring secure communications may then use the common interfaces for public-key crypto operations as described above.

The mobile device 700 may be manually synchronized with a host system by placing the device 700 in an interface cradle, which couples the serial port 730 of the mobile device 700 to the serial port of a computer system or device. The serial port 730 may also be used to enable a user to set preferences through an external device or software application, or to download other application modules 724N for installation. This wired download path may be used to load an encryption key onto the device, which is a more secure method than exchanging encryption information via the wireless network 719. Interfaces for other wired download paths may be provided in the mobile device 700, in addition to or instead of the serial port 730. For example, a USB port would provide an interface to a similarly equipped personal computer.

Additional application modules 724N may be loaded onto the mobile device 700 through the networks 719, through an auxiliary I/O subsystem 728, through the serial port 730, through the short-range communications subsystem 740, or through any other suitable subsystem 742, and installed by a user in the Flash memory 724 or RAM 726. Such flexibility in application installation increases the functionality of the mobile device 700 and may provide enhanced on-device functions, communication-related functions, or both. For example, secure communication applications may enable electronic commerce functions and other such financial transactions to be performed using the mobile device 700.

When the mobile device 700 is operating in a data communication mode, a received signal, such as a text message or a web page download, will be processed by the transceiver module 711 and provided to the microprocessor 738, which will preferably further process the received signal for output to the display 722, or, alternatively, to an auxiliary I/O device 728. A user of mobile device 700 may also compose data items, such as e-mail messages, using the keyboard 732, which is preferably a complete alphanumeric keyboard laid out in the QWERTY style, although other styles of complete alphanumeric keyboards such as the known DVORAK style may also be used. User input to the mobile device 700 is further enhanced with a plurality of auxiliary I/O devices 728, which may include a thumbwheel input device, a touchpad, a variety of switches, a rocker input switch, etc. The composed data items input by the user may then be transmitted over the communication networks 719 via the transceiver module 711.

When the mobile device 700 is operating in a voice communication mode, the overall operation of the mobile device is substantially similar to the data mode, except that received signals are preferably be output to the speaker 734 and voice signals for transmission are generated by a microphone 736. Alternative voice or audio I/O subsystems, such as a voice message recording subsystem, may also be implemented on the mobile device 700. Although voice or audio signal output is preferably accomplished primarily through the speaker 734, the display 722 may also be used to provide an indication of the identity of a calling party, the duration of a voice call, or other voice call related information. For example, the microprocessor 738, in conjunction with the voice communication module and the operating system software, may detect the caller identification information of an incoming voice call and display it on the display 722.

A short-range communications subsystem 740 may also be included in the mobile device 700. For example, the subsystem 740 may include an infrared device and associated circuits and components, or a short-range RF communication module such as a Bluetooth™ module or an 802.11 module to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

It is claimed:

1. A communication device, comprising:
   a common certification authority (CA) interface that communicates a security-related request to one of a plurality of CA provider components;
   the CA provider component configured to send the security-related request received from the common CA interface to its respective associated CA by wired or wireless electronic communication.

2. The communication device of claim 1, further comprising:
   an application communication link that exchanges data between the common CA interface and a software application.

3. The communication device of claim 2, wherein the software application is a banking application.

4. The communication device of claim 2, wherein the software application is an electronic messaging application.

5. The communication device of claim 2, wherein the software application is associated with a particular CA, and wherein the common CA interface communicates the security-related request to the one CA provider component based on the particular CA associated with the software application.

6. The communication device of claim 1, wherein the communication device is selected from the group consisting of: a data communication device, a voice communication device, a dual-mode communication device enabled for both voice and data communications, a mobile telephone having data communications capabilities, a two-way pager, a personal digital assistant (PDA) enabled for communications, and a desktop, palmtop or laptop computer having a wireless modem.

7. The communication device of claim 1, wherein the security-related request includes an encryption or digital signature-related request.

8. The communication device of claim 1, wherein the security-related request includes a request for a public key from a CA associated with one of the plurality of CA provider components.

9. The communication device of claim 1, wherein the security-related request includes a request to register a public key with a CA associated with one of the plurality of CA provider components.

10. A multiple certification authority (CA) handler comprising instructions to:
    receive a security-related request from a first application;
    determine among a plurality of CA provider components which of the CA provider components are associated with the first application; and
    communicate the security-related request to the associated CA provider.

11. The multiple certification authority (CA) handler of claim 10, further comprising instructions to change the CA provider that is associated with the first application.

12. The multiple certification authority (CA) handler of claim 10, further comprising instructions to add a second CA provider that is associated with the first application.

13. The multiple certification authority (CA) handler of claim 10, further comprising instructions to communicate the security-related request to a plurality of associated CA providers.

14. The multiple certification authority (CA) handler of claim 10, further comprising instructions to remove a CA provider that is associated with the first application.

15. The multiple certification authority (CA) handler of claim 10, wherein the multiple CA handler resides on a communication device.

16. The multiple certification authority (CA) handler of claim 15, wherein the communication device is selected from the group consisting of: a data communication device, a voice communication device, a dual-mode communication device enabled for both voice and data communications, a mobile telephone having data communications capabilities, a two-way pager, a personal digital assistant (PDA) enabled for communications, and a desktop, palmtop or laptop computer having a wireless modem.

17. A method implemented on a mobile device, comprising the steps of:

receiving a security-related request from a first application;

determining among a plurality of CA provider components which of the CA provider components are associated with the first application; and communicating the security-related request to the associated CA provider.

18. The method of claim 17, further comprising the step of:

changing the CA provider that is associated with the first application.

19. The method of claim 17, further comprising the step of:

adding a second CA provider that is associated with the first application.

20. The method of claim 17, further comprising the step of:

removing a CA provider that is associated with the first application.

* * * * *